United States Patent
Tsai Chen

(10) Patent No.: US 8,023,187 B1
(45) Date of Patent: Sep. 20, 2011

(54) CABINET PROJECTION SCREEN WITH AUTOMATIC PUSH-PULL STRUCTURAL FUNCTION

(75) Inventor: Chang-Hsiu Tsai Chen, Yonghe (TW)

(73) Assignee: Elite Screens China Corp., Guangdong (CN)

( * ) Notice: Subject to any disclaimer, the term of this patent is extended or adjusted under 35 U.S.C. 154(b) by 0 days.

(21) Appl. No.: 12/731,484

(22) Filed: Mar. 25, 2010

(51) Int. Cl.
*G03B 21/56* (2006.01)

(52) U.S. Cl. .......................... 359/461; 348/836

(58) Field of Classification Search .................. 359/461, 359/443; 353/79; 348/836, 842; 160/238, 160/309
See application file for complete search history.

(56) References Cited

U.S. PATENT DOCUMENTS

| | | | | |
|---|---|---|---|---|
| 4,281,352 A | * | 7/1981 | Hoffman | 348/788 |
| 4,479,144 A | * | 10/1984 | Yamazaki et al. | 348/788 |
| 4,766,422 A | * | 8/1988 | Wolters et al. | 312/198 |
| 6,191,886 B1 | * | 2/2001 | Sinkoff | 359/443 |
| 7,413,312 B2 | * | 8/2008 | Engle et al. | 353/79 |
| 2002/0118151 A1 | * | 8/2002 | Chen | 345/84 |
| 2010/0085493 A1 | * | 4/2010 | Liao | 348/836 |

* cited by examiner

*Primary Examiner* — Christopher Mahoney
(74) *Attorney, Agent, or Firm* — Hamre, Schumann, Mueller & Larson, P.C.

(57) ABSTRACT

A cabinet projection screen with an automatic push-pull structural function is provided, which includes a cabinet body (1). A screen push-pull base (13) is disposed on the cabinet body (1) through sliding rails (2, 4, 10, and 11). A scrolling mechanism (6) is disposed inside the cabinet body (1), and includes a scrolling shaft (61), a scrolling motor (8), a tape (62), and a telescopic device (7). One end of the tape (62) is fixed on the scrolling shaft (61), and the other end thereof is fixed on the screen push-pull base (13). When the scrolling motor (8) drives the scrolling shaft (61) to rotate, the scrolling shaft (61) winds the tape (62) on the scrolling shaft (61), so as to drive the screen push-pull base (13) to move towards one side of the scrolling shaft (61) through the tape (62), and at the same time the screen push-pull base (13) compresses the telescopic device (7). An elevator screen (12) is disposed on the screen push-pull base (13). The cabinet projection screen has advantages of versatility and occupying no space.

9 Claims, 2 Drawing Sheets

CABINET PROJECTION SCREEN WITH AUTOMATIC PUSH-PULL STRUCTURAL FUNCTION

BACKGROUND OF THE INVENTION

1. Field of Invention

The present invention relates to a projection screen, and more particularly to a cabinet projection screen with an automatic push-pull structural function which can be integrated with a desk or a cabinet.

2. Related Art

For a long time, a projector is generally used for product, plan, picture, or video presentation during activities such as business conference, teaching demonstration, and mobile office, so as to achieve a large-screen display function. Currently, the screen of the projector is usually suspended in an office or some special sites for use due to its large area. However, with the increasingly growing house price in urban areas, the work area or living area of people becomes more and more limited, and as the conventional projection screen needs to occupy a specific position, inconveniences are resulted in the already limited work or living space of people. Therefore, versatile office furniture is urgently needed in houses or offices, so as to realize as many functions as possible, especially the projection function, in a small space.

SUMMARY OF THE INVENTION

The present invention is directed to a cabinet projection screen with an automatic push-pull structural function. The cabinet projection screen can be used as a normal office desk or cabinet when not used for projection, and can also be used as a projection screen when necessary, so that a multi-functional office desk or cabinet is obtained.

In order to solve the above technical problem, the present invention provides a cabinet projection screen with an automatic push-pull structural function, which includes a cabinet body. A screen push-pull base is disposed on the cabinet body through sliding rails. A scrolling mechanism and a telescopic device are disposed inside the cabinet body. The scrolling mechanism is connected to the screen push-pull base. When the scrolling mechanism retracts the screen push-pull base into the cabinet body, the screen push-pull base compresses the telescopic device. The elevator screen is disposed on the screen push-pull base.

The scrolling mechanism includes a scrolling shaft, a scrolling motor, a tape, and a telescopic device. One end of the tape is fixed on the scrolling shaft, and the other end thereof is fixed on the screen push-pull base. When the scrolling motor drives the scrolling shaft to rotate, the scrolling shaft winds the tape on the scrolling shaft, so as to drive the screen push-pull base to move towards one side of the scrolling shaft through the tape.

A controller is further disposed on the cabinet body. A limit signal triggering member is disposed on the scrolling mechanism. The limit signal triggering member sends a limit signal to the controller when the screen push-pull base moves to a predetermined position. The controller controls actions of the scrolling motor.

The elevator screen includes a projection screen, a scroll, a scroll motor driving the scroll to rotate, and a compression frame. The scroll is disposed on the screen push-pull base. The projection screen is wound on the scroll. One end of the compression frame is fixed on a free end of the projection screen, and the other end thereof is fixed on the screen push-pull base. Adjacent support rods are connected through a rotating shaft. An elastic mechanism is installed on the compression frame. Two ends of the elastic mechanism are installed on the adjacent support rods, respectively.

A top cover is disposed at an upper end of the compression frame.

A projection-screen limit-signal triggering member is disposed on the support rod. The The projection-screen limit-signal triggering member sends a limit signal to the controller when the projection screen moves to a predetermined position. The controller controls actions of the scroll motor.

An infrared receiver is disposed on the cabinet body. The infrared receiver receives a control signal from a remote control, so as to control the scrolling motor and/or the scroll motor to perform corresponding actions through the controller.

The cabinet body includes a cabinet surface and a cabinet frame. The cabinet surface is movably connected to the cabinet frame.

The screen push-pull base is detachably connected to the cabinet body.

The present invention has the following efficacy. The cabinet projection screen can be used as a normal office desk or cabinet when not used for projection, and can also be used as a projection screen when necessary, so that a multi-functional office desk or cabinet is obtained.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
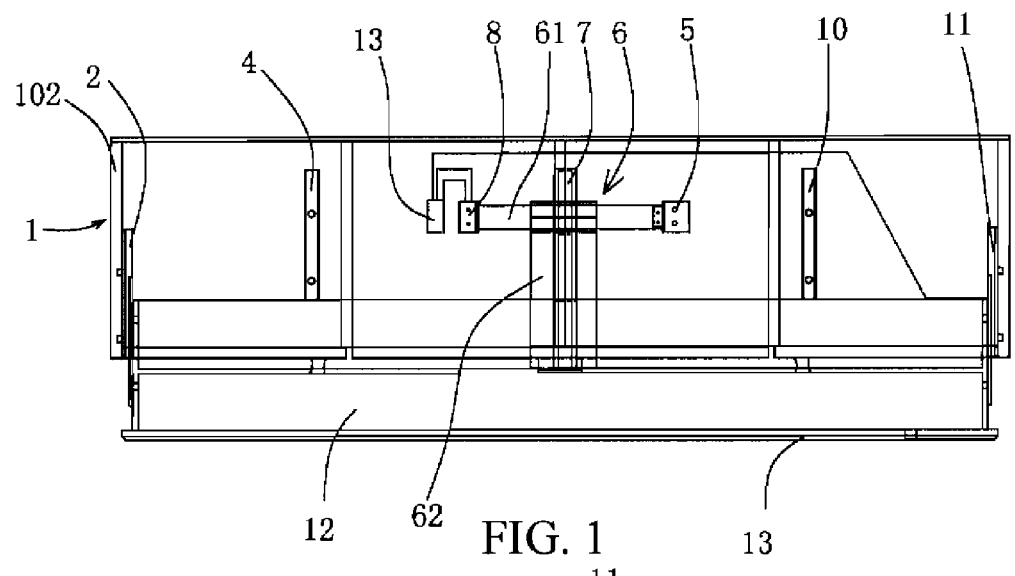
FIG. 1 is a schematic structural top view according to an embodiment of the present invention (with a cabinet surface removed)
Figure 2:
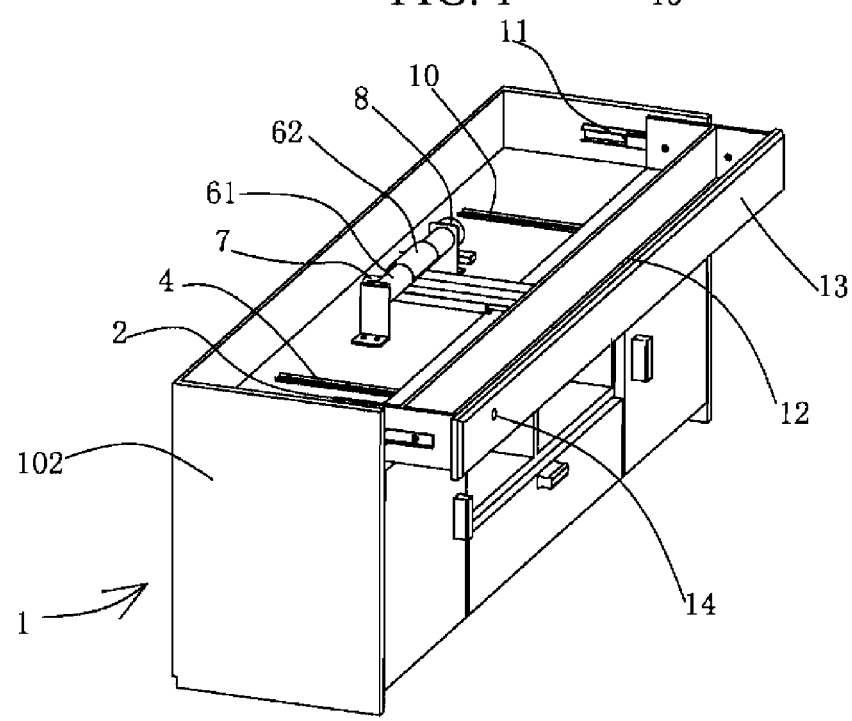
FIG. 2 is a schematic three-dimensional structural view of the embodiment in FIG. 1 (with the cabinet surface removed)

Referring to FIGS. 1 and 2, the present invention provides a cabinet projection screen with an automatic push-pull structural function, which includes a cabinet body 1. In this embodiment, the cabinet body may be a cabinet or a desk in daily life. A screen push-pull base 13 is disposed on the cabinet body 1 through sliding rails 2, 4, 10, and 11. The screen push-pull base 13 can slide back and forth along the sliding rails 2, 4, 10, and 11. A scrolling mechanism 6 is disposed inside the cabinet body 1. The scrolling mechanism 6 includes a scrolling shaft 61, a scrolling motor 8 (which may be a servo motor), a tape 62, and a telescopic device 7. One end of the tape 62 is fixed on the scrolling shaft 61, and the other end thereof is fixed on the screen push-pull base 13. When the scrolling motor 8 drives the scrolling shaft 61 to rotate, the scrolling shaft 61 winds the tape 62 on the scrolling shaft 61, so as to drive the screen push-pull base 13 to move towards one side of the scrolling shaft 61 through the tape 62, and at the same time the screen push-pull base 13 compresses the telescopic device 7. In this embodiment, the telescopic device 7 may be a spring or a one-way cylinder. When the screen push-pull base 13 moves to one side of the scrolling shaft 61, the screen push-pull base 13 compresses the spring or cylinder, so that the spring or cylinder stores energy for use in opening the screen push-pull base 13. An elevator screen 12 is disposed on the screen push-pull base 13. A structure of the elevator screen 12 is further illustrated with reference to FIG. 6. For the structure of the elevator screen 12, reference may also be made to a prior patent of the applicant, that is, Chinese Patent No. 200820213004.8. In the present invention, the cabinet body 1 includes a cabinet surface 101 and a cabinet frame 102. The cabinet surface 101 is movably connected to or fixedly connected to the cabinet frame 102. When the cabinet surface 101 is movably connected to the cabinet frame 102, it is convenient for maintenance of the scrolling mechanism 6 disposed inside the cabinet body.

The screen push-pull base 13 is detachably connected to the cabinet body 1. The detachable connection mode may be connection through sliding rails like a drawer (such a structure is used in this embodiment) or a structure that the screen push-pull base 13 is embedded in the cabinet body. Therefore, when the projection function needs to be used separately, the screen push-pull base 13 can be taken from the cabinet body and used as a separate projection device.

In this embodiment, a controller 9 is further disposed on the cabinet body 1. The controller 9 is used for controlling actions of the scrolling motor 8 and a scroll motor 18. When the controller 9 is used for controlling the scrolling motor 8, a limit signal triggering member 5 needs to be disposed on the scrolling mechanism 6. The limit signal triggering member 5 sends a limit signal to the controller 9 when the screen push-pull base 13 moves to a predetermined position, and the controller 9 controls actions of the scrolling motor 8. In this embodiment, the limit signal triggering member 5 may be two contacts. The limit signal triggering member 5 is disposed on the scrolling shaft 61 or at other positions of the screen push-pull base 13, as long as the two contacts are connected and send a limit signal to the controller 9 when the screen push-pull base 13 moves to a predetermined position after the scrolling shaft 61 rotates for a certain scrolling number, and at this time the scroll motor 8 stops rotation. Certainly, the limit signal triggering member 5 may also be other elements capable of generating an electric signal, such as a photoelectric switch or a travel switch. When it is intended to stretch the screen push-pull base 13, it only needs to release the screen push-pull base 13 from the control of the scrolling motor 8, so that the screen push-pull base 13 springs open automatically under the effect of the telescopic device 7.

Figure 5:
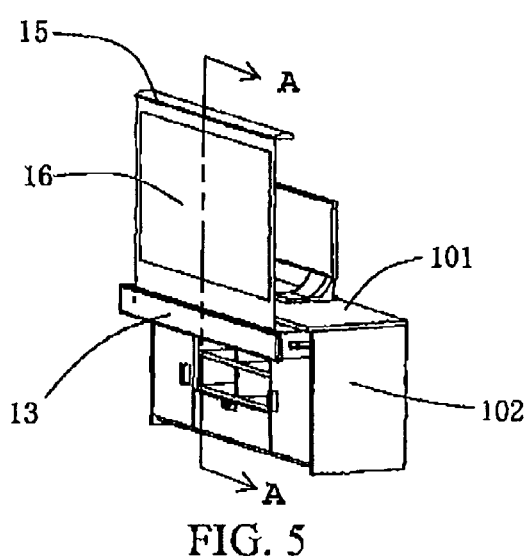
FIG. 5 is a schematic structural view after an elevator screen in FIG. 4 is raised.
Figure 6:
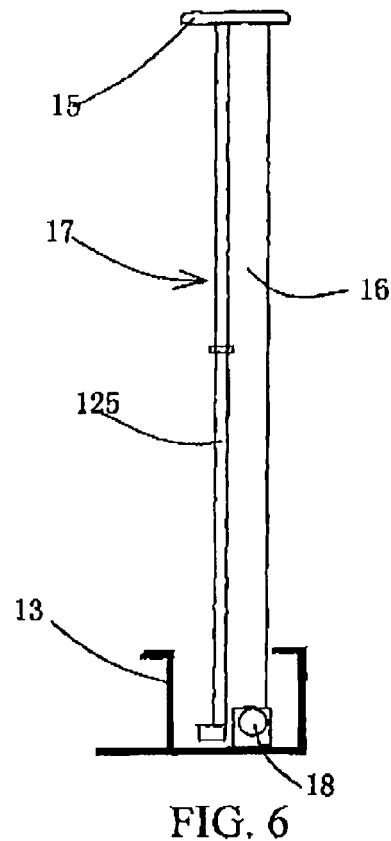
FIG. 6 is a schematic structural view along Section line A-A in FIG. 5.

FIG. 6 is a schematic structural view along Section line A-A in FIG. 5. The elevator screen 12 includes a projection screen 16, a scroll, a scroll motor 18 driving the scroll to rotate, and a compression frame 17. The scroll is disposed on the screen push-pull base 13. The projection screen 16 is wound on the scroll. One end of the compression frame 17 is fixed on a free end of the projection screen 16, and the other end thereof is fixed on the screen push-pull base 13. Adjacent support rods 125 are connected through a rotating shaft. An elastic mechanism is installed on the compression frame 17. Two ends of the elastic mechanism are installed on the adjacent support rods 125, respectively. The elastic mechanism may be a spring or a one-way cylinder. For a one-way cylinder, when the screen push-pull base 13 retracts into the cabinet body 1, the air inside the cylinder is compressed to store energy, so that the one-way cylinder pushes the screen push-pull base 13 open under the effect of the compressed air when the screen push-pull base 13 needs to be stretched. A top cover 15 is disposed at an upper end of the compression frame 17.

When the compression frame 17 is completely folded, the top cover 15 is covered on the projection screen 16 to protect the projection screen 16. Similarly, a projection-screen limit-signal triggering member is disposed on the support rod 125. The projection-screen limit-signal triggering member sends a limit signal to the controller 9 when the projection screen 16 moves to a predetermined position (that is, lowered to a predetermined position), and the controller 9 controls actions of the scroll motor 18. Similarly, when it is intended to raise the elevator screen 12, it only needs to release the elevator screen 12 from the control of the scroll motor 18, so that the compression frame 17 springs open (that is, rises) automatically under the effect of the elastic mechanism. In this embodiment, an infrared receiver 14 is disposed on the cabinet body. The infrared receiver 14 receives a control signal from a remote control, so as to control the scrolling motor 8 and/or the scroll motor 18 to perform corresponding actions through the controller 9.

Figure 3:
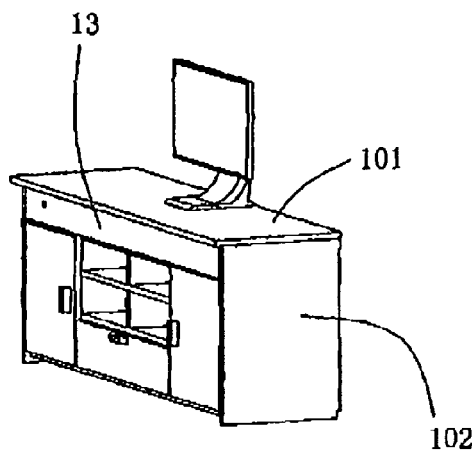
FIG. 3 is a schematic three-dimensional structural view of FIG. 2 when the cabinet surface is added.
Figure 4:
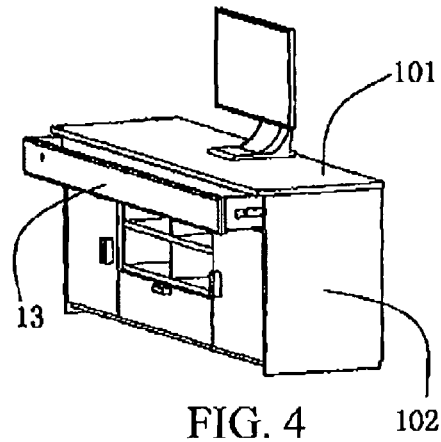
FIG. 4 is a schematic structural view when a screen push-pull base in FIG. 3 is stretched.

Referring to FIGS. 3 to 5, FIGS. 3 to 5 are schematic views of the elevator screen from a closed status to a completely open status according to the present invention.

The examples in the above embodiments are merely the most preferred examples for illustrating the present invention and are not intended to limit the scope of the invention. Any slight changes or replacements made according to the principles of the present invention shall fall within the scope of the present invention.

What is claimed is:

1. A cabinet projection screen with an automatic push-pull structural function, comprising a cabinet body (1), wherein a screen push-pull base (13) is disposed on the cabinet body (1) through sliding rails (2, 4, 10, and 11), a scrolling mechanism (6) and a telescopic device (7) are disposed inside the cabinet body (1), the scrolling mechanism (6) is connected to the screen push-pull base (13), when the scrolling mechanism (6) retracts the screen push-pull base (13) into the cabinet body, the screen push-pull base (13) compresses the telescopic device (7), and an elevator screen (12) is fixedly disposed on the screen push-pull base (13).

2. The cabinet projection screen with an automatic push-pull structural function according to claim 1, wherein the scrolling mechanism (6) comprises a scrolling shaft (61), a scrolling motor (8), a tape (62), and a telescopic device (7), one end of the tape (62) is fixed on the scrolling shaft (61) and the other end thereof is fixed on the screen push-pull base (13), and when the scrolling motor (8) drives the scrolling shaft (61) to rotate, the scrolling shaft (61) winds the tape (62) on the scrolling shaft (61), so as to drive the screen push-pull base (13) to move towards one side of the scrolling shaft (61) through the tape (62).

3. The cabinet projection screen with an automatic push-pull structural function according to claim 1, wherein a controller (9) is further disposed on the cabinet body (1), a limit signal triggering member (5) is disposed on the scrolling mechanism (6), the limit signal triggering member (5) sends a limit signal to the controller (9) when the screen push-pull base (13) moves to a predetermined position, and the controller (9) controls actions of the scrolling motor (8).

4. The cabinet projection screen with an automatic push-pull structural function according to claim 3, wherein the elevator screen (12) comprises a projection screen (16), a scroll, a scroll motor (18) driving the scroll to rotate, and a compression frame (17), the scroll is disposed on the screen push-pull base (13), the projection screen (16) is wound on the scroll, one end of the compression frame (17) is fixed on a free end of the projection screen (16) and the other end thereof is fixed on the screen push-pull base (13), adjacent support rods (125) are connected through a rotating shaft, an elastic mechanism is installed on the compression frame (17), and two ends of the elastic mechanism are installed on the adjacent support rods (125) respectively.

5. The cabinet projection screen with an automatic push-pull structural function according to claim 4, wherein a top cover (15) is disposed at an upper end of the compression frame (17).

6. The cabinet projection screen with an automatic push-pull structural function according to claim 5, wherein a projection-screen limit-signal triggering member is disposed on the support rod (125), the projection-screen limit-signal triggering member sends a limit signal to the controller (9) when the projection screen (16) moves to a predetermined position, and the controller (9) controls actions of the scroll motor (18).

7. The cabinet projection screen with an automatic push-pull structural function according to claim 6, wherein an infrared receiver (14) is disposed on the cabinet body, and used for receiving a control signal from a remote control, so as to control the scrolling motor (8) and/or the scroll motor (18) to perform corresponding actions through the controller (9).

8. The cabinet projection screen with an automatic push-pull structural function according to claim 7, wherein the cabinet body (1) comprises a cabinet surface (101) and a cabinet frame (102), and the cabinet surface (101) is movably connected to the cabinet frame (102).

9. The cabinet projection screen with an automatic push-pull structural function according to claim 1, wherein the screen push-pull base (13) is detachably connected to the cabinet body (1).

\* \* \* \* \*